United States Patent [19]

Szczepanik et al.

[11] 4,108,679

[45] Aug. 22, 1978

[54] PIGMENT COMPOSITION CONTAINING ELEMENTAL CARBON AND PROCESS OF MAKING THE SAME

[75] Inventors: Michael F. Szczepanik, Allen Park; Joseph F. Sryniawski, Lincoln Park; Adolph Busseman, Detroit; Robert D. Shannon, Ann Arbor, all of Mich.

[73] Assignee: Ebonex Corporation, Melvindale, Mich.

[21] Appl. No.: 744,187

[22] Filed: Nov. 22, 1976

[51] Int. Cl.$^2$ ............................................. C09C 1/48
[52] U.S. Cl. ................................. 106/307; 106/308 B
[58] Field of Search ................... 106/307, 308 B, 309, 106/288 B; 423/445, 448

[56] References Cited

U.S. PATENT DOCUMENTS

| | | | |
|---|---|---|---|
| 3,203,819 | 8/1965 | Steenken | 106/307 |
| 3,488,204 | 1/1970 | Jordan et al. | 106/308 B |
| 3,622,650 | 11/1971 | Newton | 106/307 |

*Primary Examiner*—Winston A. Douglas
*Assistant Examiner*—J. V. Howard
*Attorney, Agent, or Firm*—Krass & Young

[57] ABSTRACT

A composition useful as a pigment is disclosed, the composition comprised of a particulate filler material such as silica, with the individual particles being coated with elemental carbon in the form of fine particles such as those contained in carbon black. The composition is produced by a mechanical processing of a dry mixture of the particulate material and the carbon black of proportions of up to approximately 50% by weight of carbon black and 50% or more of silica of a 50 to 100 micron particle size range. The mixture is processed in a ball mill to reduce the particle size of the particulate material to an average 10 micron size, the particles at the same time being coated by deposition of the carbon black particles so as to adhere tightly to the surface thereof. An air flotation separation process sorts the resulting coated particles into various size ranges suitable for particular applications.

2 Claims, No Drawings

PIGMENT COMPOSITION CONTAINING ELEMENTAL CARBON AND PROCESS OF MAKING THE SAME

BACKGROUND OF THE INVENTION

1. Field of the Invention

This invention concerns a pigment compositions and processes for manufacturing the same, and more particularly pigment compositions containing elemental carbon.

2. Description of the Prior Art

The use of elemental carbon in its various forms such as carbon black, channel black, lamp black etc., as a black pigment is widespread but certain disadvantages of this material are encountered in its use. Firstly the cost of manufacturing such elemental carbons has increased considerably in recent years since the burning of petroleum or natural gas is often involved in their manufacture.

Secondly, in use as a paint pigment dispersed in a vehicle, the oil absorption characteristic of such materials as carbon black, channel black, etc., is quite high. The oil absorption characteristic is related to the amount of vehicle required to completely coat and disperse the carbon particles, and since such vehicles are typically petroleum based they likewise are quite expensive. This high oil absorption comes about because of the very fine particle size of these forms of carbon generally of a size range of 1/100 of a micron, and the resulting great surface area of a given quality of carbon.

This fine particle size also creates difficulties in manufacturing pigments containing such carbon materials inasmuch as this requires rather sophisticated equipment in order to produce proper dispersal of the particles in the vehicle, this equipment necessitating highly skilled personnel to operate and considerable capital expense.

These disadvantages associated with carbon pigmenting have heretofore been recognized by those skilled in the art and attempts have been made from time to time, in the past, to provide an elemental carbon containing pigments comprised of carrier bodies of a larger particle size, upon which has been deposited elemental carbon.

One such approach is disclosed in U.S. Pat. No. 2,258,438, involving a method of producing such a particulate black pigment by heating at high temperatures a spent filtering clay medium which had been used to filter oil, with the heat producing destructive distillation of the oil leaving a carbon residue on the clay particles, the resulting carbon-clay material then being ground in a ball mill and then transported to a separator to sort the various particle sizes and remove the large grains present in the large clay.

A similar approach is described in U.S. Pat. Nos. 1,424,729 and 1,609,120, which disclose a method of destructive distillation of oil coated clay or silica particles to produce particles covered with elemental carbon.

Another such approach is described in U.S. Pat. No. 2,156,591 in which a material referred to as "silica black" or "carburized silica" is created by mixing a coal tar material with a finely divided diatomaceous earth, a subsequent destructive distillation of the tar similarly producing a carbonization of the tar and leaving a coating on the silica particles. A residue of approximately 8% to 10% by volume remains in the mixture.

A further approach is described in U.S. Pat. Nos. 3,094,428; 3,662,650 and 3,390,006 in which a method is disclosed in which is formed a mixture of silica and carbon black in a slurry which is dried and ground to produce a filler mixture which is utilized in improving the physical qualities of rubber.

All of these processes, however, are relatively expensive to carry out inasmuch as they involve high temperature heating to produce destructive distillation, or slurry mixing processes and subsequent drying, both of these processes requiring rather extensive equipment to carry out. Furthermore, certain nondesirable residues are typically produced in the instance of the spent filtering media approach as described, and the quantity of such materials available for manufacturing pigment would be somewhat limited and depend on the usages in other industries. It would also involve the expense of handling, shipping, recovering of the filtering materials.

It is accordingly an object of the present invention to provide a pigment or filler material containing elemental carbon of improved body and oil absorption characteristics which does not contain undesirable residues tending to affect the tinting power, body or other characteristics of the resulting composition.

A further object of the present invention is to provide a process for making such a pigment which does not involve elaborate manufacturing processes such as destructive distillation, burning, slurry forming etc., nor the capital equipment necessary for such processes.

SUMMARY OF THE INVENTION

These and other objects which will become apparent upon reading of the following specification and claims is accomplished by a composition produced by a process of a mechanical deposition of elemental carbon particles upon the surface of larger carrier bodies. This process, including the formation of a dry mixture of the proportions of up to 50% of carbon black and the remainder silica, with a ball mill grinding process being carried out to reduce the size of the particulate carrier bodies and spheroidize these particles, this samd step producing a coating by adhesion of the carbon black particles to the silica particles to produce a composition of superior body which is much lower in cost and easier to produce dispersal thereof in a pigment vehicle.

DETAILED DESCRIPTION

In the following specification in a specific embodiment will be described in accordance with 35 USC 112 and particular terminology will be employed for the sake of clarity but the same should not be construed in a limiting sense inasmuch as the concept of the present invention is susceptible to many variations within the scope of the appended claims.

The composition according to the present invention comprises a combination of fine particles of elemental carbon such as are present in carbon black or channel black upon a much larger size particulate filler such as silica, the composition being produced by the process wherein a dry mixture of such filler particles of a size on the order of 50 to 100 microns being suitable are mixed with the elemental carbon particles of a size range on the order of 1/100 of a micron in the ratio of up to 50% of elemental carbon. Portions of greater than 50% of elemental carbon tend to produce a mixture containing free carbon particles tending to adversely affect the body of the material and waste the carbon black. Lesser proportions of carbon black, of course, affect the tinting power albeit a particular material having a substantial amount of black tinting power would be provided in mixtures containing as little as 5% by weight of such carbon particles.

These carbon particles and filler particles are mechanically mixed together and processed in a ball mill, the ball mill reducing the average size of the filler particles while at the same time roughly spheroidizing them to produce a particle of 1–20 micron diameter sizes, the average particle size being on the order of 10 microns.

It has been discovered by the present inventors that in processing the above described mixture in a ball mill, there occurs a deposition of these carbon particles on the outer surface of the filler particles so as to adhere tightly thereto. This produces a pigment composition having superior body with considerably less quantity of carbon black required. This superior body allows the use of simple mixing machines to create dispersal thereof in the pigment vehicle and also exhibits low oil absorption characteristics so as to minimize the quantity of the vehicle required.

The resulting mixture would typically be processed in an air flotation or cyclone separator in order to segregate the particles by various particle size ranges suitable for various applications. The larger particles, i.e., those in excess of 20 microns in size would typically be reprocessed in order to reduce their size in the ball mill.

It should be appreciated that the particular size ranges described are those particularly adapted to applications such as paint pigment, etc., and the composition could, however, be applied to particle filler particles of other size ranges suitable for a differring application.

Similarly the process of producing carbon black, i.e., the burning of hydrogen gas and deposition thereof on collector surfaces produces a conglomeration of the elemental carbon particles which it has been found produce superior results for the application described, but such elemental carbon could be produced by other processes such as the channel black process.

It has been found by the present inventors that exceptionally good results are produced with the use of silica as the particulate filler, a very tight adhesion of the elemental carbon particles being on the surface of the silica particles produced by the above process in which the silica particles initially have a diameter of 50 to 100 microns in size prior to being reduced in size in the ball mill as described.

Similarly, although very good results were produced by the use of silica having particle sizes on the order of 50 to 100 microns, it should be understood that other materials having suitable chemical and other physical properties adaptable to the particular application could also be used such as fillers comprised of clay, ground phosphate rock, diatomaceous earth. Additionally, the tinting strength of pigments such as bone black can be enhanced by a similar deposition of elemental carbon thereon of a deeper color than bone black. Also, the grinding processes could be carried out by apparatus other than ball mills, i.e., pulverize or impact mills.

The reason for the tight adhesion of the elemental carbon particles to the carrier bodies is not entirely understood but it seems reasonable to suppose that the relatively rough micro structure of the silica particles may produce some mechanical adhesion of the carbon particles and, in addition, certain weak electrical attraction such as Vanderwaals forces, etc., may be present between the outer surface of the carrier bodies and the elemental carbon particles. It has been found that in the example given the adhesion is rather tight and for most applications typical solvents will not produce separation from of the filler particles and the elemental carbon particles such that a very stable pigment is produced, useful in such fields as paints, material colorings, etc.

The embodiments of the invention in which an exclusive property or privilege is claimed are defined as follows:

1. A process of manufacturing a composition of matter comprising the steps of forming a dry mixture of elemental carbon having a finely particulate structure on the order of 1/100 micron in diameter; a particulate filler of a particle size on the order of 50 to 100 microns in diameter, said elemental carbon particles comprising from 5 – 50% by weight of said mixture; grinding said mixture to reduce the diameter of the filler particles to a size in the range of 1 – 20 microns and produce a deposition of said elemental carbon particles upon the outer surface of said filler particles.

2. The process according to claim 1 wherein said particulate filler is comprised of silica.

* * * * *